(12) United States Patent
Borque Marquina et al.

(10) Patent No.: US 9,212,447 B2
(45) Date of Patent: Dec. 15, 2015

(54) TUB SECTION FOR A WASHING MACHINE

(75) Inventors: Noelia Borque Marquina, Saragossa (ES); Miguel Angel Gomez Caudevilla, Saragossa (ES); Ismael Gracia Bobed, Saragossa (ES); Alberto Mañas Molina, Saragossa (ES); Eduardo Recio Ferrer, Saragossa (ES)

(73) Assignee: BSH BOSCH UND SIEMENS HAUSGERÄTE GmbH, Munich (DE)

( * ) Notice: Subject to any disclaimer, the term of this patent is extended or adjusted under 35 U.S.C. 154(b) by 1309 days.

(21) Appl. No.: 13/003,882

(22) PCT Filed: Jul. 22, 2009

(86) PCT No.: PCT/EP2009/059419
§ 371 (c)(1),
(2), (4) Date: Jan. 13, 2011

(87) PCT Pub. No.: WO2010/010114
PCT Pub. Date: Jan. 28, 2010

(65) Prior Publication Data
US 2011/0113833 A1 May 19, 2011

(30) Foreign Application Priority Data
Jul. 22, 2008 (EP) .................................... 08380227

(51) Int. Cl.
*B29C 65/70* (2006.01)
*D06F 37/26* (2006.01)

(52) U.S. Cl.
CPC ............ *D06F 37/262* (2013.01); *D06F 37/263* (2013.01); *D06F 37/269* (2013.01); *Y10T 29/49826* (2015.01)

(58) Field of Classification Search
CPC ..... D06F 37/22; D06F 37/262; D06F 37/263; D06F 37/264; D06F 37/269
USPC ..................... 68/139, 140, 141, 142
See application file for complete search history.

(56) References Cited

U.S. PATENT DOCUMENTS

| | | | |
|---|---|---|---|
| 5,329,791 A * | 7/1994 | Cargnel et al. ..................... 68/24 |
| 7,862,871 B2 * | 1/2011 | Caudevilla et al. ........... 428/35.7 |
| 2006/0125150 A1 * | 6/2006 | Gomez Caudevilla et al. ........................... 264/328.8 |
| 2007/0062225 A1 * | 3/2007 | Fechtel et al. .................. 68/3 R |
| 2007/0068199 A1 * | 3/2007 | Dahlmann et al. ................ 68/30 |
| 2009/0165506 A1 | 7/2009 | Marquina et al. |

FOREIGN PATENT DOCUMENTS

| | | | |
|---|---|---|---|
| EP | 219115 | B1 * | 4/1996 |
| EP | WO2007115904 | A1 | 10/2007 |
| EP | 1881100 | A1 | 1/2008 |
| EP | 2248936 | A1 * | 11/2010 |

* cited by examiner

*Primary Examiner* — Joseph L Perrin
(74) *Attorney, Agent, or Firm* — Nixon & Vanderhye P.C.

(57) ABSTRACT

A method of manufacturing a tub section for a washing machine, wherein the tub section has a bearing housing of a bearing. The method includes manufacturing a first pre-product having the bearing housing and a plastic cover covering a side surface of the bearing housing; manufacturing a plastic second pre-product; and joining the first pre-product and the second pre-product to form the tub section. The plastic cover of the first pre-product has a greater material strength than the second pre-product and the plastic cover of the first pre-product and the plastic second pre-product include the same base product.

30 Claims, 8 Drawing Sheets

TUB SECTION FOR A WASHING MACHINE

BACKGROUND OF THE INVENTION

The invention relates to a method of manufacturing a tub section, in particular rear section, for a washing machine, to a first pre-product and a second pre-product of a tub section, and to a tub section, in particular a rear tub section, for a washing machine.

Nowadays, most tubs of domestic washing machines are made of plastic material(s) except for a ball bearing that is made of metal.

WO 2007/115894 A1 describes a tub of that generic kind for a clothes washing-machine, in particular of the domestic type which houses a rotating drum within which the washing load is placed, said washing tub consisting of a peripheral cylindrical housing formed by a tub front section and a tub rear section which are joined at their respective plastic material edges, enclosing the drum in their interior, by the fusion welding of the plastic materials of said edges, forming a weld bead between the tub front section and the tub rear section where the edges are joined by at least two joining lines.

WO 2007/115904 A1 discloses a tub for a clothes washing-machine, in particular of the domestic type which houses a rotating drum within which the washing load is placed, said washing tub consisting of a peripheral cylindrical housing formed by a tub front section and a tub rear section which are joined, enclosing the drum in their interior, by plastic fusion welding, where the tub front section features at least one front lug and the rear tub section features at least one rear lug, which face each other on closing the tub and to which a damper is fixed by means of a pin, where the pin is formed of a single piece on one of the lugs and is joined to the other lug by means of plastic fusion welding.

Commonly, a plastic compound is used that comprises a polypropylene (PP) base loaded with a filler such as talc or fibre glass. Usually, talc is used as reinforcement filler material in washing machines of low revolutions and fibre glass in those of high revolutions.

Since the tub holds the revolving drum of the washing machine, the tub usually comprises two tub sections, namely a front section and a rear section, that are joined after the drum has been inserted. The rear tub section usually is the one that has greater requirements regarding strength because it holds the bearing housing that in turn is part of a ball bearing leading a driveshaft to the drum in order to spin it. Front and rear tubs are at the moment injected in one go at two different cavities engraved within the same mould.

During the manufacturing process, the most common technique is to inject said plastic compound (PP+filler load) via the bearing holding; this holding (or 'hub') itself acts as a core for the whole set, and a metal-plastic union takes place at the interface of both materials. In order to get a proper fastening between the injected plastic compound and the metallic bearing housing, the surface of the bearing housing is provided with numerous grooves to get a fair adherence. On the other hand, and in order to avoid a thermal shock when injection of the plastic is carried out at the metallic bearing housing, the latter must be previously warmed up to a temperature ranging from 40° C. to 60° C. before it is positioned within the mould. Since the bearing housing is made of metal, usually of steel, it has a size and weight directly related to the revolutions with which the drum must spin. Thus, for high revolutions the bearing housing has to be larger that for low revolutions, and its weight changes from one kilogram for the smallest ones to two kilograms for the biggest ones. This amount of warmed up steel in addition to approx. Six liters of PP at 240° C. having a geometry full of regions of great thickness creates some intensely heated zones.

This manufacturing process incurs undesirable consequences. Some of those drawbacks are a not always satisfactory dimensional stability because of a difference of the material contraction rates, cooling curves and different mass ration between metal and plastic. In particular, micro spaces could occur between the plastic and the metal causing a bad adherence. Further, a cooling time of longer than 8 hours that badly affects the whole process (the steel acts the same way as a hot core that keeps heat for a long time like it was a thermos flask). In addition, and due to the long cooling time, it becomes necessary to stock the freshly injected tubs for some hours, which leads to a cost increase.

BRIEF SUMMARY OF THE INVENTION

It is an object of the present invention to lessen or to avoid one or more of the above stated problems, and in particular to provide a tub that is cheaper to manufacture and/or more reliable than previous tubs.

This object is achieved by a method of manufacturing a tub section, in particular rear tub section, by a first pre-product of a tub section, by a second pre-product of a tub section, and by a tub section, in particular a rear tub section, for a washing machine according to the respective independent claim. Advantageous embodiments are particularly disclosed by the dependent claims or in the subsequent specification.

Generally, the object is achieved by separately producing a high strength region of a tub section in the vicinity of and including the bearing and a lower strength region of the tub section.

According to an aspect of the invention, a method of manufacturing a tub section (or tub) for a washing machine is provided, wherein the tub section (or tub) comprises at least a bearing housing. The method comprises at least the following steps: manufacturing a first pre-product at least comprising the bearing housing and a plastic cover covering at least the side surface of the bearing housing; manufacturing a plastic second pre-product; and joining the first pre-product and the second pre-product to form the tub section.

By such a method a region of high mechanical load around the bearing may be designed to other specifications than the rest of the tub. Thus, for the region around the bearing may be used a small quantity (volume) of relatively expensive but strong material to satisfy the requirement for durability and reliability while for the rest of the tub a larger quantity of cheap material may be used which gives an overall cheaper design. Further advantages are described below. Since the amount of injected plastic material onto the bearing housing is much smaller than in the traditional process, most negative effects owing to thermal shock disappear and cooling becomes extremely fast, at the same time the dimensional stability is highly improved because of a reduction in micro spaces.

Further, the plastic cover of the first pre-product is the stronger material, i.e. that the plastic cover of the first pre-product comprises a greater material strength than the second pre-product. Therefore, these two components have a material strength fitted to their needs.

Even further, the plastic cover of the first pre-product and the plastic second pre-product comprise the same base product, e.g. PP, PEEK, PTFE. Thus, the first pre-product and the plastic second pre-product can be connected without further problems since the base product of the two components behaves as one. Also, the material of the first pre-product and the plastic second pre-product behaves basically similar. This facilitates manufacture and avoids material mismatch problems to a large extend. It follows that the tub section is cheaper to manufacture and more reliable than previous tubs or tub sections.

In particular, the plastic cover of the first pre-product is the stronger material, preferably by comprising a greater concentration, e.g. vol-%, or type (talc. vs. fibres, for example) of a reinforcement filler material than the second pre-product It is one preferred embodiment that the second pre-product does not contain any reinforcement filler material. Thus, the step of manufacturing the first pre-product may comprise the sub-steps of: pre-heating the bearing housing, and injecting the plastic cover onto the bearing housing.

Preferredly, the housing is heated in advance of the injection of its plastic cover.

Preferredly, the plastic cover also covers at least a front surface and/or a rear surface of the bearing housing.

Preferredly, the manufacturing step(s) comprise(s) a manufacturing by injection moulding.

Preferredly, the joining step may include any non self-detachable connection technique like certain screwing arrangements, clipping, welding, gluing, and so on.

Preferredly, the plastic cover covers at least the outer surface of the bearing housing, i.e. side surface, front surface, and rear surface.

Preferredly, the step of manufacturing the plastic second pre-product comprises manufacturing the plastic second pre-product by injection moulding via several injection points, in particular three injection points, and preferably peripherally positioned injection points.

Preferredly, the step of joining the first pre-product and the second pre-product comprises joining the first pre-product and the second pre-product by welding, in particular vibration welding.

It is another preferred embodiment that the method comprises a further step of selecting the first pre-product from a set of several different first pre-products wherein the different first pre-products differ at least in the material strength of their plastic cover, wherein the selecting step is performed before the joining step. This implies that the outer contour of the different first pre-products is equal or basically the same at least at a contact region to the second pre-product such that the different first pre-products fit with or can be connected to the second pre-product without additional adaptations. Thus, the same second pre-product can be used for manufacturing tub sections having different first pre-products. This greatly lowers manufacturing costs for the second pre-product.

It is a further preferred embodiment that the first pre-products differ in the type and/or concentration of the reinforcement filler material and/or in the size and/or weight of the respective bearing housing. To comply with the required form of the contour, the pre-products may have to offset a larger (and thus often heavier) bearing housing by using less material for the plastic cover.

It is another preferred embodiment that the first pre-products are designed for different rotational velocities. For example, the second pre-product may be designed for any existing or potential rotational velocities. Thus, to produce tub sections or tubs for washing machines allowing different maximum rotational velocities, only a different first pre-product needs to be selected.

It is a particularly preferred embodiment that the first pre-products differ in that they comprise a greater material strength the higher is an allowed rotational velocity. Additionally, the first pre-products may differ in that they comprise a larger and/or heavier bearing housing the higher is the maximum or allowed rotational velocity.

Under another aspect of the invention, a first pre-product of a tub section for a washing machine comprises only a part of the tub section, in particular rear tub section, which includes a bearing housing and a plastic cover covering at least the side surface of the bearing housing.

Further, the plastic cover of the first pre-product comprises at least one radially extending protrusion comprising at least one material line at its surface, in particular at its intended contact surface with the second pre-product. This gives an extra bonding zone material for a welding process such that the structural material does not need to be melted.

Under another aspect of the invention, a second pre-product is made of the base product without any reinforcement filler material. The second pre-product comprises a connection region (e.g. an opening for inserting the first pre-product and/or a contact region) for connecting with another tub section but does not comprise a bearing housing.

Under another aspect of the invention, a tub section, in particular a rear tub section, for a washing machine comprises a plastic region around a bearing housing wherein the plastic region comprises at least two sub-regions of different mechanical strength, wherein a first sub-region of the at least two sub-regions with the higher or highest mechanical strength is located around the bearing housing. Further, the at least two sub-regions comprise the same base product.

Preferredly, the a volumetric ratio of the sub-region with the higher mechanical strength to the sub-region with the lower mechanical strength lies in the range from 5% to 45%, in particular in the range from 30% to 40%.

To complement the description of preferred embodiments of the present invention under its various aspects which is to be made below, and in order to better understand the invention, a drawing comprising a set of schematical Figures is attached to this specification. In the following, preferred embodiments of the invention are described at greater detail with reference to the drawing. It should be understood that the description of the preferred embodiments is not intended to limit the invention.

BRIEF DESCRIPTION OF THE DRAWINGS

In the drawing, equal reference numerals have been used for equal or similar elements throughout the Figures.

In particular.

DETAILED DESCRIPTION OF EXEMPLARY EMBODIMENTS OF THE PRESENT INVENTION

Figure 1:
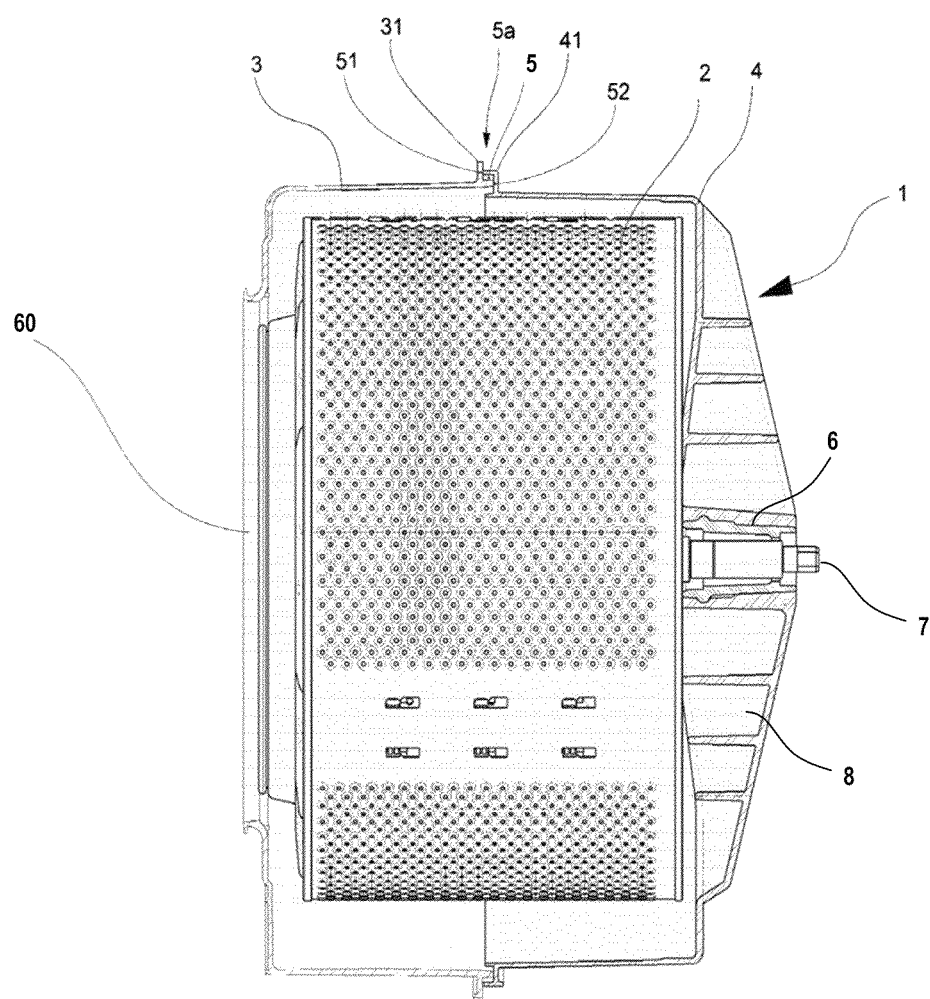
FIG. 1 shows a side view of the profile of a washing tub with the drum inserted into its interior according to prior art.

FIG. 1 shows a schematic section of a tub 1 for a clothes washing-machine, in particular of a domestic type, which houses a rotating drum 2 within which the washing load is placed. The washing-machine is of the front-loading type, with an opening 10 in the tub front section 3 for the insertion of the washing load. The tub 1 is manufactured from plastic by injection moulding and comprises a peripheral cylindrical housing made from two parts, a tub front section 3 and a tub rear section 4 which are joined along their respective open edges 31, 41, enclosing the drum 2 in their interior, by means of fusion welding of the plastic materials of the edges 31, 41, producing a weld bead 5a between the tub front section 3 and the tub rear section 4. The system for closing the same by welding is the system of closure by vibration. The edges 31, 41 are joined along at least two joining lines 51, 52, forming a chamber 5 between the edges 31, 41 along the perimeter of the weld bead 5a.

At the centre of the tub rear section 4 is arranged a metallic ball bearing of which only the bearing housing 6 is shown. The remainder of the tub rear section 4 is formed by a plastic region 8 surrounding the bearing housing 6. The ball bearing supports a driveshaft 7 that drives the drum 2.

Figure 2A:
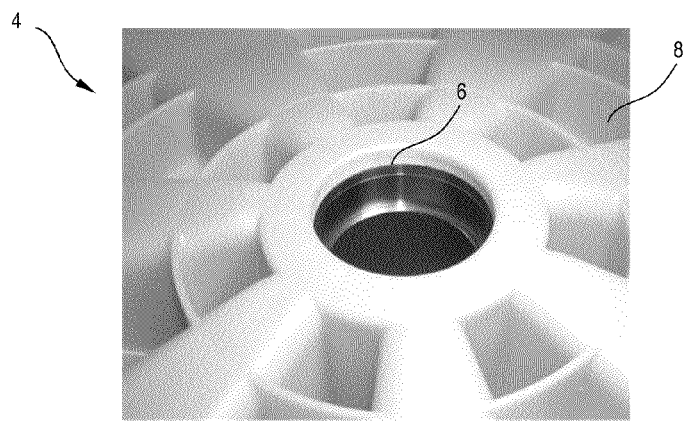
FIG. 2A-2C show pictures of a rear tub section, or parts thereof, according to the prior art, namely a rear tub section in a perspective view (FIG. 2A), a bearing housing in a perspective view (FIG. 2B), and a side view of a cut through the plastic part of the rear tub section of FIG. 2A in the vicinity of the bearing housing.
Figures 2B, 2C:
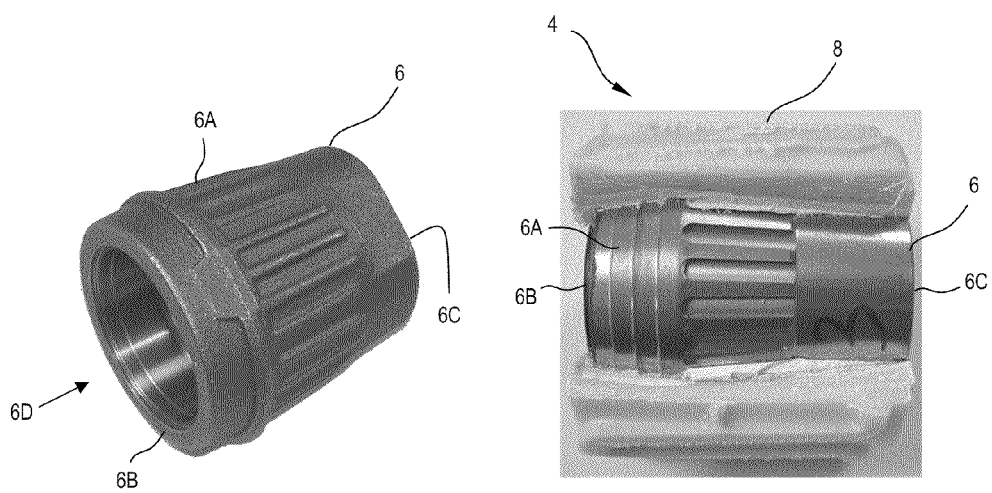

FIG. 2A shows a picture of a part of the tub rear section 4 of FIG. 1 with the bearing housing (also called a 'hub') 6 and the plastic tub region 8 conformed around it. Usually, the hub 6 is positioned at the centre of the mould into which the plastic compound of the plastic region 8 is injected. FIG. 2B shows the bearing housing 6 alone with its side surface 6A, its front surface 6B, its rear surface 6C (the 'outer surface' of the bearing housing 6), and its through hole (inner surface) 6D adapted to house the balls and the driveshaft. FIG. 2C shows part of the tub rear section 4 of FIG. 2A with the metal bearing housing 6 exposed. The plastic tub region 8 has been cut to check out the quality of the union between plastic and metal.

Figure 3A:
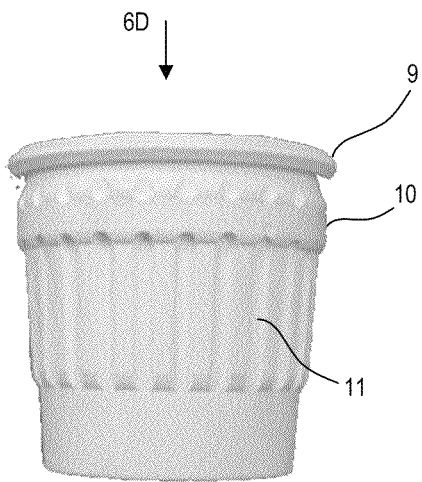
FIG. 3A-3B show a side view of two embodiments of a first pre-product for making a rear tub section according to the invention.

FIG. 3A, in a side view, shows a photograph of a first pre-product 9 for making a rear tub section. The first pre-product 9 comprises the bearing housing (not shown) and a plastic cover 10 covering the outer surface (side surface, front surface, and rear surface) of the bearing housing. In this embodiment, the thickness of the plastic cover 10 is so small that the contour of the bearing housing shows on the outer surface of the plastic cover 10, for example, grooves 11. The plastic cover 10 offers a greater resistance to mechanical loads than the rest of the plastic region of the tub section due to its stronger/reinforced material.

Figure 3B:
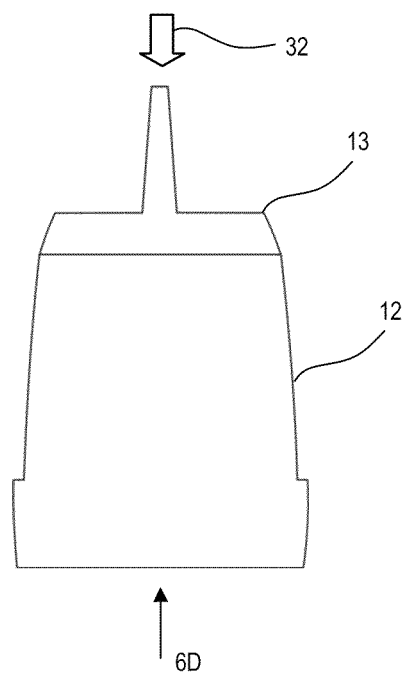

FIG. 3B, in a side view, shows a schematic drawing of a moulded work piece for making a first pre-product 12, as it leaves an injection machine. The lower part corresponds to a first pre-product 12 according to a second embodiment with a different contour of the outer cover compared to FIG. 3A, and the upper part 13 will have to be removed. The arrow indicates the respective injection moulding point 32. The next step is to incorporate two ball bearings and a sealing gasket into the bearing housing to form a ball bearing.

The first pre-product 9, 12 can be manufactured independently. For example, the bearing housing is introduced inside a mould into which the plastic cover 9 (e.g., layer or 'undercoat') is injected around its contour or outer surface. For this, the housing is heated in advance before it is inserted into the mould. While the injection is performed as before at the housing region, the amount of injected material is much smaller than in the traditional process. Thereby, negative effects owing to thermal shock disappear, and cooling becomes extremely fast while at the same time a structural stability is highly improved.

The respective plastic cover 9 only contains a fraction of the volume (or weight) of the whole plastic region of the rear tub section, preferably 5% to 45%, in particular 10% to 40% and even more preferred 30% to 40%, e.g., about one liter of material. This amount may depend on the size of the bearing housing: the larger the bearing housing is, the smaller the fraction may be to maintain a constant outer dimension, for example.

The material of the plastic cover may exhibit a higher mechanical strength than the material of the second pre-product. In particular, the plastic cover of the first pre-product may contain a polymeric PP base (matrix), with a higher filler material concentration (e.g., talc and/or fiber glass) as compared to the rest of the plastic tub section, e.g., the second pre-product. Depending on the required load, e.g., the desired rotary speed of the drum (600, 1000, 1200 rpm etc.), the type and amount(s) of the reinforcing filler material(s) is chosen before the injection moulding. For example, the plastic cover may comprise PP with glass fiber and/or talc as reinforcing filler for 600 rpm, PP and glass fibers of 15% for 1000 rpm, and PP and glass fibers of 30% for 1400 rpm.

The second pre-product (without figure) may also be manufactured independently from the first pre-product (together with the front tub section if appropriate) so that the rear tub section may be produced with no need to introduce any metallic volume. It therefore does comprise a connection region (including a joining line etc.) for connecting with the front tub section but does not comprise the (metallic) bearing housing. Thanks to this, cooling times are significantly improved since heat dissipation is much faster thanks to the absence of a metallic core. Deformations are also smaller, and an immediate use of the second pre-product is possible after this stage.

The injection may be speeded up as compared to filling through a central point by using different injection points around the mould, as is the case with front tub sections. In addition it is possible to standardize the plastic region of the rear tub section, i.e., without depending on a hub size, thus producing from a single mould. This significantly improves the manufacturing process because according to prior practice every housing for a bearing needs a particular mould for the injection of the tub, or at least with some changes.

The second pre-product may particularly comprise the same polymeric base as plastic of the first pre-product but with a reduced fillers concentration. This includes the case of not adding any filler materials for improving the mechanical strength. The material of the second pre-product is thus cheaper but well connectable to the first pre-product because of the same material base, e.g. PP.

Figure 4:
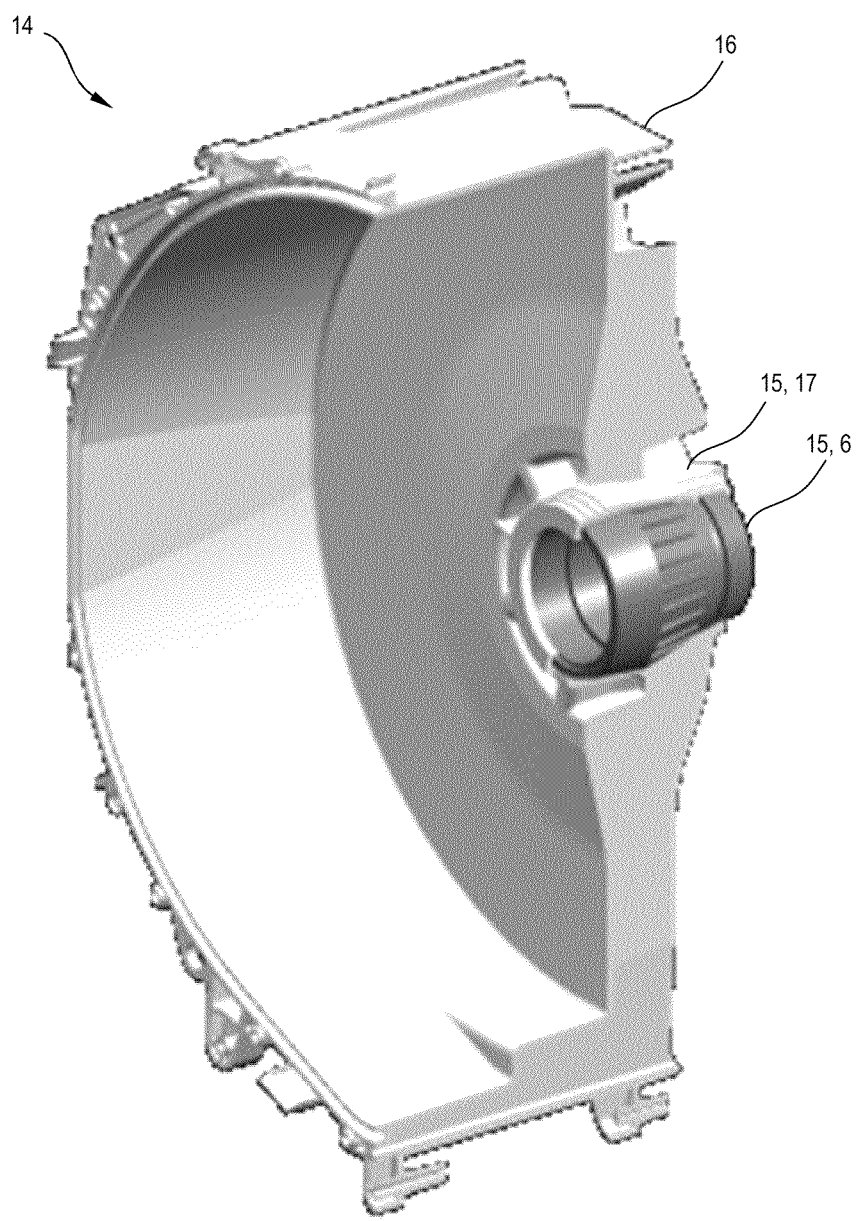
FIG. 4 shows a perspective view on a rear tub section according to the invention with the plastic region cut.

FIG. 4 shows an assembled rear tub section 14 according to the invention with a first pre-product 15 and a second pre-product 16 joint together, as will be explained in greater detail further below. The second pre-product 16 has been cut in half to expose the first pre-product 15 which in turn has a plastic cover 17 cut to expose the underlying bearing housing 6.

By choosing the material of the plastic cover 17 such that it has a higher mechanical strength than the material of the second pre-product 16, the plastic volume of the rear tub section 14 comprises two sub-regions 16, 17 of different mechanical strength, wherein the sub-region with the higher mechanical strength (the plastic cover) 17 is located around the bearing housing 6. By such a design, the manufacturing costs may be reduced because only the plastic cover 17 may be comprised of the more expensive material of higher strength while the rest of the plastic region, i.e., the second pre-product 16, may be made of less expensive plastic material. At the same time, the mechanical strength of the tub section 14 is as good as if its plastic region would have been completely made out of the material of higher strength. Even better, the costs to reinforce the cover 17 are limited. In other words, the region proximal to the bearing housing 6 with its greater mechanical requirement can widely be reinforced, with no need of spreading this costly reinforcement to further parts of the tub 1,4 in which it is not necessary.

A manufacturer thus has the choice to produce the rear tub section 14 according to the invention (and thus the tub) with the same reliability for fewer costs and/or with an improved reliability for the same costs.

Figure 5:
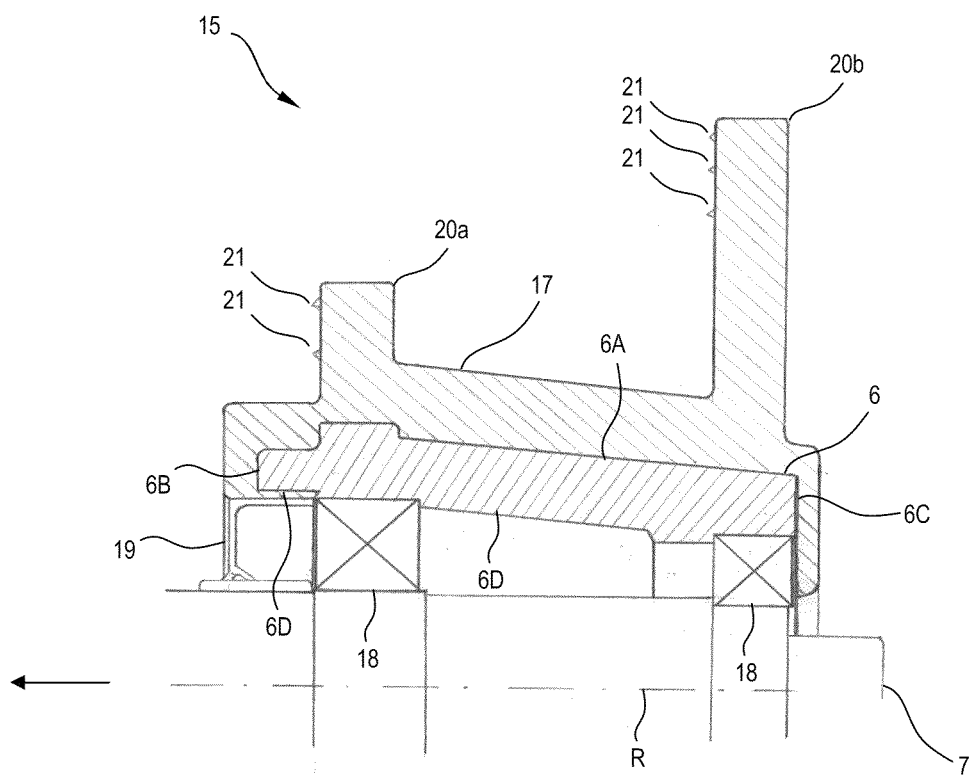
FIG. 5 shows a schematic cross-sectional view of an upper half of the first pre-product of FIG. 4 before assembly.

FIG. 5 shows a schematic cross-sectional view of an upper half of the first pre-product 15 of FIG. 4 before assembly with the second pre-product. Inserted into the bearing housing 6 are now the driveshaft 7 of longitudinal axis R (at the same time longitudinal axis of the first pre-product 15) and other elements like the ball bearing 18 and a sealing gasket 19. The plastic cover 17 covers the outer surface 6A,6B,6C of the bearing housing 6, and even a part of the inner surface 6D. This ensures a safe and rigid connection.

The plastic cover 17 further comprises two radially extending protrusions 20, namely a front protrusion 20a and a rear protrusion 20b. In a circumferential direction, the protrusions 20 form walls that are spaced apart from each other by the same angle, see also FIG. 4. The front protrusion 20a is shorter than the rear protrusion 20b such that the first pre-product 15 may be inserted into a reception region of the second pre-product for receiving the first pre-product 15 while both protrusions 20 are adapted to be connected to the second pre-product. For this, both protrusions 20 comprise a certain extra material volume at an intended contact area, here: material lines 21 to provide extra material when melting occurs during welding, for example. For connection with the second pre-product, the first pre-product 15 is to be inserted in the direction indicated by the straight arrow.

Figure 6:
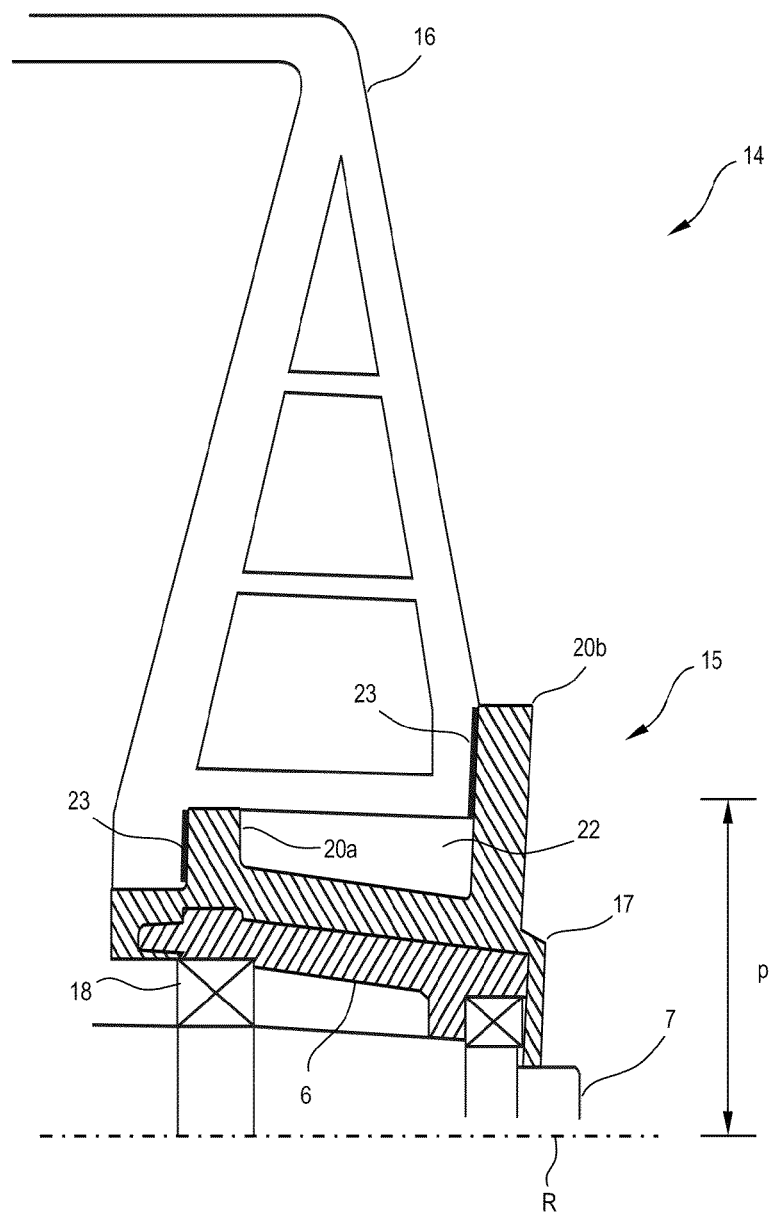
FIG. 6 shows a schematic cross-sectional view of an upper half of the assembled rear tub section of FIG. 4.

FIG. 6 shows a schematic cross-sectional view of an upper half of the assembled rear tub section 14 of FIG. 4. The first pre-product 15 has been inserted into the second pre-product 16 from the rear (the right hand side in this figure) into a reception region comprising an opening 22 for accommodating the first pre-product 15. The second pre-product 16 radially contacts the first pre-product 15 at a front rim of the first pre-product 15 facing the drum and at the upper surface of the front protrusion 20a. Lateral contact between the pre-products 15,16 is provided at a front area of each of the protrusions 20a, 20b. These lateral contact areas are at the same time the bonding areas 23 for non-detachably connecting the pre-products 15,16. In the present case, this has been performed by vibration welding. In order to supply melted material without significantly affecting the structure of the pre-products 15,16 the material lines 21 of FIG. 5 are used. During welding they melt and largely provide the necessary bonding zone. This gives a stable, cheaper to manufacture, and functionally improved rear tub section 14 of a tub 1 of a domestic washing machine (including a washer-dryer assembly). The bonding is easily performed because of the same material base (here: PP) of the plastic cover 17 and the plastic second pre-product 16.

Figure 7:
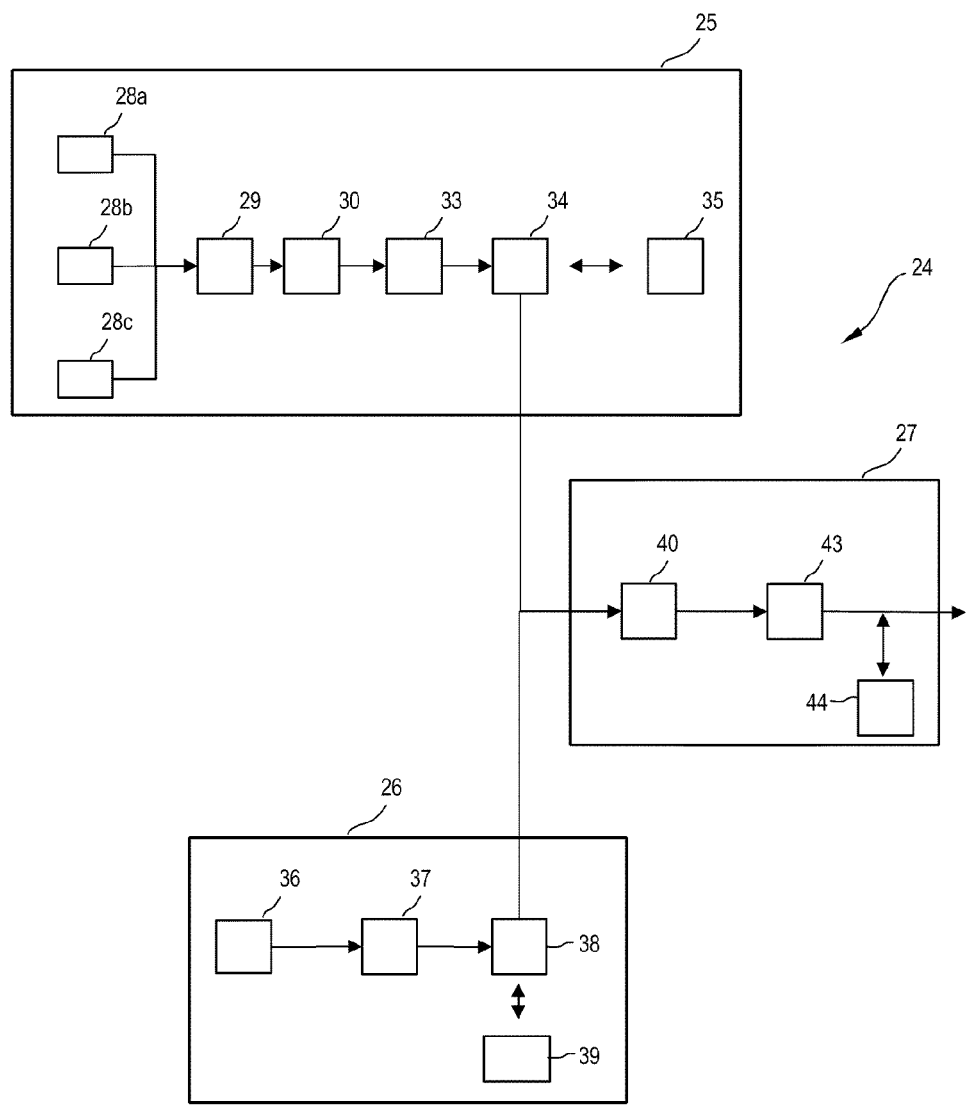
FIG. 7 shows a schematic process diagram of a manufacturing line for making the rear tub section.

FIG. 7 shows a schematic process diagram of a manufacturing line 24 for making the rear tub section. The manufacturing line 24 comprises a first sub-line 25 for producing the first pre-product, a second sub-line 26 for producing the second pre-product, and an assembly sub-line 27 for joining the pre-products.

The first sub-line 25 comprises three plastic injection moulding stations 28a, 28b, 28c where the plastic cover is injected onto the bearing housing. The moulding stations 28a, 28b, 28c are adapted to produce first pre-products of different characteristics, e.g., and required maximum rotational speed of the drum. For example, moulding station 28a is adapted to produce a first pre-product for use in a washing machine having a maximum rotational speed of the drum of only 600 rpm. This requires only a small bearing housing of about 1 kg of metal and a plastic cover having a material with a relatively low content of reinforcing filler, e.g. talc. The second moulding station 28b may be adapted to produce a first pre-product having a maximum rotational speed of the drum of 1000 rpm. This requires a larger bearing housing of, e.g., about 1.5 kg of metal and a plastic cover having a material with a medium content of reinforcing filler, e.g. 15% of glass fibers. The third moulding station 28c may be adapted to produce a first pre-product having a maximum rotational speed of the drum of 1400 rpm. This requires an even larger bearing housing of, e.g., about 2 kg of metal and a plastic cover having a material with a high content of reinforcing filler, e.g. 30% of glass fibers. Since at least the radial contour of the first pre-products is to be very similar or the same for all rotational speeds, the volume of the plastic cover has to be decreased as the bearing gets larger.

Following the injection moulding stations 28a, 28b, 28c is an injection point removing station 29, a cooling station 30, an assembly station 33 for assembling the bearing housing and ball bearings and sealing gasket, and a quality control station 34. The cooling of the first pre-product (bearing housing and plastic cover) cooling is very fast due to the small volume, and at the same time dimensional stability is very good. Splitting the manufacturing process in two lines 25,26 allows to carry out quality controls on each pre-product which makes it possible to eliminate defective pre-products with no need to lose a whole tub, as before. For example, if the plastic-metal union of the first pre-product between the bearing housing and the plastic cover is deficient, this pre-product alone is rejected without affecting the production of the second pre-product, or the whole tub section as known from the prior art. The finished first pre-product may than be stocked 35 or directly delivered to the assembly sub-line 27. The first sub-line 25 may be placed at and organized by a supplier.

The second sub-line 26 comprises only one injection moulding station 36 for forming the second pre-product for all drum rotation speed variations because of a standardized interface with the first pre-product. A mould for the second pre-product may also comprise the mould for the front tub section. In other words, the adaptations concerning the rotational speed of the drum may be restricted to the first pre-product such that an equal second pre-product may be employed for all speeds. The injection moulding station 36 is followed by a cooling station 37 and a quality control station 38. Cooling is considerably faster without the bearing housing than with it. The finished first pre-product may than be stocked 39 or directly delivered to the assembly sub-line 27.

At the assembly sub-line 27, first pre-product from the first manufacturing sub-line 25 and the second pre-product from the second manufacturing sub-line 26 are joined to give the complete rear tub section of the tub. For this, the assembly sub-line 27 comprises a vibration welding station 40 and a quality control station 43. The finished rear tub section may then be stocked 44 or directly delivered for further assembly of the tub and washing machine.

Thus, the prior art manufacturing process has been partly split into two sub-lines which brings many advantages. The invention offers the possibility of local mould injection depending on the requirements of the different parts of the rear tub section.

Figure 8:
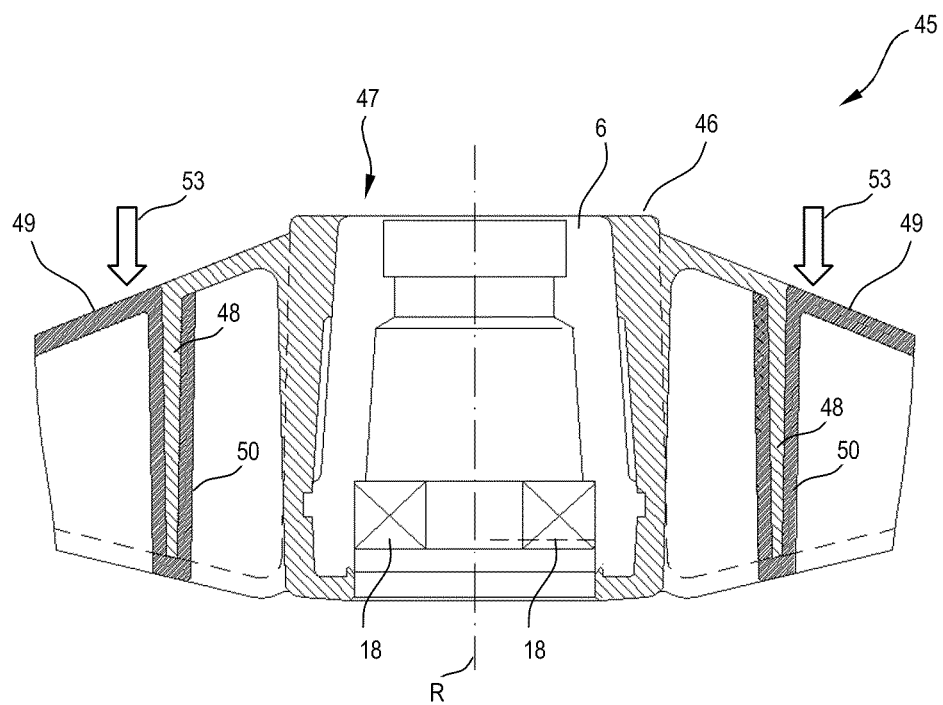
FIG. 8 shows a schematic partial cross-sectional view of an assembled rear tub section according to another embodiment.

FIG. 8 shows a rear tub section 45 according to another embodiment with the bearing comprising the bearing housing 6 of FIG. 2B with a ball bearing 18 that is surrounded by a plastic cover 46 thus forming a first pre-product 47. The plastic cover 46 now comprises a cup-shaped extension 48 that radially extends from the plastic cover in the vicinity of the bearing housing 6. The second pre-product 49 comprises a revolving notch 50 that serves as a reception for the cup-shaped extension 48. The revolving notch 50 of the second pre-product 49 can be slipped onto the cup-shaped extension 48 for assembly and subsequently welded for fixation.

The second pre-product 49 is injection-moulded via several injection moulding points 51, three in this case arranged in angular symmetry around the longitudinal axis R at some distance from it, of which only two are shown.

The invention is not restricted to the described preferred embodiments.

For example, other reinforcement fillers than talc and glass fibers may be used, like other inorganic fibers, metal fibers or inorganic fibers. The plastic base material of the plastic cover and the second pre-product may be different. The plastic base material may be another thermoplastic material, like PTFE or PEEK, or even a duroplastic or elastomeric material.

Generally, the first pre-product may be moulded with only the bearing housing present and subsequent assembly of the ball bearings and sealing gasket (shaft seal) which allows higher process temperatures. As shown, the ball bearings and the shaft seal are advantageously assembled before connection with the second pre-product.

To be able to omit or simplify the subsequent assembly step, the first pre-product may be moulded with the bearing housing and any additional part. Under one aspect, only the shaft needs to be fitted afterwards.

Generally, the invention shows at least the following advantages:

The most resistant and expensive material is only used in areas of high load, thus saving expensive material. The reinforcement thanks to, e.g., glass fiber or talc filler, is only needed around the bearing housing with a fraction of the total plastic volume, e.g., one liter of reinforced plastic material instead of the 6 liters used for the tub in a traditional process.

A rejection of the whole tub section is avoided in case of defects in the housing bearings surroundings. Rather, only the pre-product needs to be rejected.

The invention allows an increase of the drum's rpm because of the possible and not too expensive plastic resistance increase near the bearing housing area.

The process can be carried out automatically.

A reduction of microholes between the metal, in particular steel, and the plastic surfaces caused by shrinkage is can be achieved.

A good union of the welded plastic of both pre-products materials can be achieved, in particular if they have same plastic material base, e.g., PP.

A heat insulation of the housing bearings is provided in the injection process of the tub.

Improvement of thickness and inner defects caused by shrinkage is achieved.

Dimensional stability improvement of the tub is achieved since the deformations due to thermal reasons are smaller.

Dimension stability is improved by a greater thickness of the ribs.

Average stocking time for stabilization of the product is reduced since the cooling time is much shorter.

A best quality requirement for ball bearings and sealing gasket is achieved. Since they may be mounted by the supplier, the quality parameters may be more demanding.

LIST OF REFERENCE NUMERALS 1 tub
2 drum
3 tub front section
4 tub rear section
5 chamber
5a weld bead
6 bearing housing ('hub')
6A side surface
6B front surface
6C rear surface
6D inner surface
7 driveshaft
8 plastic tub region
9 first pre-product
10 plastic cover
11 groove
12 first pre-product
13 upper part
14 rear tub section
15 first pre-product
16 second pre-product
17 plastic cover
18 ball bearing
19 sealing gasket
20a protrusion
20b protrusion
21 material line
22 opening
23 bonding area
24 manufacturing line
25 first sub-line
26 second sub-line
27 assembly sub-line
28a moulding station
28b moulding station
28c moulding station
29 injection point removing station
30 cooling station
31 open edge
32 injection moulding point
33 assembly station
34 quality control station
35 stock
36 injection moulding station
37 cooling station
38 quality control station
39 stock
40 vibration welding station
41 open edge
43 quality control station
44 stock
45 rear tub section
46 plastic cover
47 first pre-product
48 cup-shaped extension
49 second pre-product 50 revolving notch
51 joining line
52 joining line
53 injection moulding point
60 opening
R rotational axis

The invention claimed is:

1. A method of manufacturing a rear tub section for a washing machine, wherein the rear tub section has a bearing housing of a bearing, the method comprising:
   manufacturing a first pre-product having the bearing housing and a plastic cover covering a side surface of the bearing housing;
   manufacturing a plastic second pre-product including a rear side wall of the rear tub section; and
   joining the first pre-product and the plastic second pre-product to form the rear tub section;
   wherein the plastic cover of the first pre-product has a greater material strength than the plastic second pre-product due to a greater concentration or type of a reinforcement filler material; and
   wherein the plastic cover of the first pre-product and the second plastic pre-product include the same plastic or elastomeric base material.

2. The method of claim 1, wherein the plastic cover of the first pre-product has a greater concentration of the reinforcement filler material than the plastic second pre-product.

3. The method of claim 2, wherein the plastic second pre-product is manufactured of a plastic base material without the reinforcement filler material.

4. The method of claim 2, wherein the step of manufacturing the first pre-product comprises:
   pre-heating the bearing housing; and
   injecting the plastic cover onto the bearing housing.

5. The method of claim 1, wherein the plastic cover of the first pre-product and the plastic second pre-product have a different reinforcement filler material.

6. The method of claim 1, wherein the plastic second pre-product is manufactured by injection moulding via a plurality of injection points.

7. The method of claim 6, wherein the plurality of injection points includes three injection points.

8. The method of claim 1, wherein first pre-product and the plastic second pre-product are joined by welding.

9. The method of claim 8, wherein the welding is vibration welding.

10. The method of claim 1, further comprising selecting the first pre-product from a plurality of different first pre-products wherein the different first pre-products differ in material strength of the respective plastic cover of the different first pre-products, and wherein the selecting step is performed before the joining step.

11. The method of claim 10, wherein the different first pre-products differ in at least one of:
   at least one of the type and the concentration of the reinforcement filler material;
   a size of a respective bearing housing; and
   a weight of the respective bearing housing.

12. The method of claim 10, wherein the different first pre-products are designed for different rotational velocities.

13. The method of claim 12, wherein the different first pre-products differ in that a material strength of a respective one of the different first pre-products is greater the higher an allowed rotational velocity.

14. The method of claim 1, wherein the plastic cover of the first pre-product has a greater material strength than the plastic second pre-product due to a material composition of the plastic cover.

15. The method of claim 1, wherein the base material is a thermoplastic material, duroplastic material, or elastomeric material.

16. The method of claim 15, wherein the base material is a thermoplastic material.

17. The method of claim 16, wherein the thermoplastic material is polypropylene (PP), polyetheretherketone (PEEK) or polytetrafluoroethylene (PTFE).

18. The method of claim 1, wherein the reinforcement filler material comprises inorganic fibers.

19. The method of claim 18, wherein the inorganic fibers include talc, glass and/or metal.

20. A rear tub section for a washing machine, the rear tub section comprising:
   a bearing housing; and
   a plastic region around the bearing housing;
   wherein the plastic region has a first sub-region and a second sub-region, the second sub-region including a rear side wall of the rear tub section;
   wherein a first mechanical strength of the first sub-region is greater than a second mechanical strength of the second sub-region due to a greater concentration or type of a reinforcement filler material;
   wherein the first sub-region is located around the bearing housing and the second sub-region is joined to the first sub-region; and
   wherein the first sub-region and the second sub-region include the same plastic or elastomeric base material.

21. The tub section of claim 20, wherein a volumetric ratio of the first sub-region with the greater mechanical strength to the second sub-region with a lower mechanical strength lies in a range of 5% to 45%.

22. The tub section of claim 21, wherein the range of the volumetric ratio is 30% to 40%.

23. The tub section of claim 20, wherein the first mechanical strength of the first sub-region is greater than a second mechanical strength of the second sub-region due to a material composition of the first sub-region.

24. The tub section of claim 20, wherein the second sub-region does not include a reinforcement filler material.

25. The tub section of claim 20, wherein the base material is a thermoplastic material, duroplastic material, or elastomeric material.

26. The tub section of claim 25, wherein the base material is a thermoplastic material.

27. The tub section of claim 26, wherein the thermoplastic material is polypropylene (PP), polyetheretherketone (PEEK) or polytetrafluoroethylene (PTFE).

28. The tub section of claim 20, wherein the first mechanical strength of the first sub-region is greater than the second mechanical strength of the second sub-region due to a greater concentration of the reinforcement filler material in the first sub-region than in the second sub-region.

29. The tub section of claim 20, wherein the reinforcement filler material comprises inorganic fibers.

30. The tub section of claim 29, wherein the inorganic fibers include talc, glass and/or metal.

* * * * *